G. WOOD.
LAWN MOWER.
APPLICATION FILED APR. 23, 1919.
1,377,953.
Patented May 10, 1921.
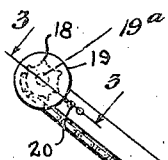
Fig. 1.
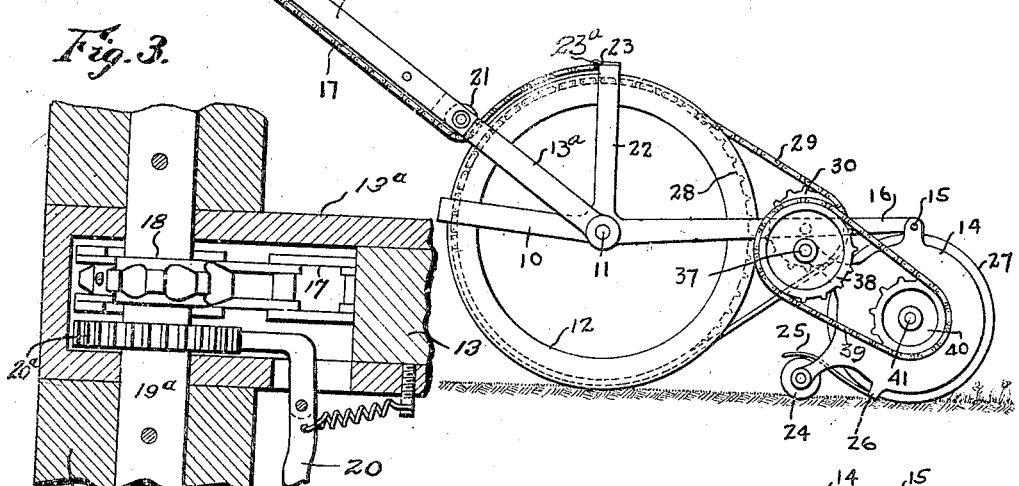
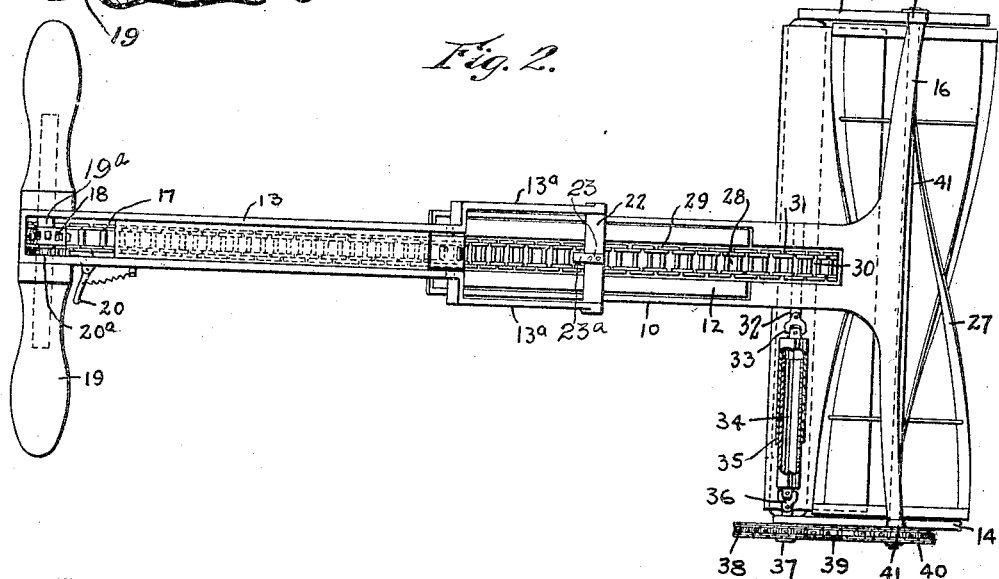
WITNESSES
INVENTOR
Golen Wood,
BY
ATTORNEYS

UNITED STATES PATENT OFFICE.

GALEN WOOD, OF SEATTLE, WASHINGTON.

LAWN-MOWER.

1,377,953.  Specification of Letters Patent.  Patented May 10, 1921.

Application filed April 23, 1919. Serial No. 292,019.

*To all whom it may concern:*

Be it known that I, GALEN WOOD, a citizen of the United States, and a resident of Seattle, in the county of King and State of Washington, have invented a new and Improved Lawn-Mower, of which the following is a description.

My invention relates to lawn mowers, and has for its general object to provide a lawn mower improved in various particulars, whereby to possess various important characteristics and advantages among which are the following: The wheels commonly employed on mowers at the side to extend in front of and beyond the ends of the blades are replaced by a wheel positioned in the rear of the blades and in a plane approximately central of the blades, thereby giving the mower in general a monocycle character; the blade carrying section of the frame is supported in a novel manner to be caused to take a path corresponding with the irregularities of the ground surface over which the mower is run; a novel means is provided for raising and lowering the blade carrying section of the frame through the medium of the cross bar of the handle; an effective drive means is provided compatible with the monocycle character of the mower and the particular manner of suspending the blade carrying section and the particular means for raising and lowering the same; a general result is obtained that an easy running machine is provided having a uniform action. Also, the construction results in presenting the blades only to the unmowed grass and enabling the machine to cut closely to walks, fences, and the like, and to cut over and trim the edges of laws as well as to mow narrow strips now usually cut with a trimmer following the operation of the lawn mower. My improved mower is advantageous also in mowing up and down terraces, over and around mounds, along ditches, ridges, and other obstructions or irregularities in the contour of the ground, and under shrubs, hedges, and other low projections over lawns.

Other advantages and characteristics of my improved machine will appear from the specific description following.

Reference is to be had to the accompanying drawings forming a part of this specification, it being understood that the drawings are merely illustrative of one example of the invention.

Figure 1 is a side elevation of a lawn mower embodying my invention;

Fig. 2 is a plan view thereof;

Fig. 3 is an enlarged detail in transverse section at the juncture of the handle at its cross bar as indicated by the line 3—3, Fig. 1.

Referring first more particularly to the construction illustrated in Figs. 1 to 3, the main frame 10 presents a general U-shape extending about the sides of a single running wheel 12, the axle 11 of which turns in suitable bearings in the sides of said frame and are received in bearings on the forward ends of a strap 13$^a$ embracing and reinforcing the handle 13. The blade carrying section 14 of the frame is pivotally hung at the top thereof as at 15 by any suitable hanger means to the outer ends of transverse arms 16 rigid with the front end of the frame 10.

For rocking the frame 10 on the axle 11 to raise or lower the blade carrying section 14, I provide means connected with said frame and operable by a turning movement of the cross bar or handle bar 19 of the handle 13. Said handle has a shaft or central rod 19$^a$ therein revolubly mounted in the outer end of the strap 13$^a$ of handle. A chain 17 or equivalent flexible element extends from the cross bar 19 along the under side of the handle 13 and upward about an idler 21 on said handle adjacent to the wheel 12, the forward end of said chain being connected with the frame 10, there being for the purpose an arched member 22 on said frame and the connection being established by a plate 23 in the illustrated example, said plate being connected by its hooked end 23$^a$ with the chain and secured to said arched member. The turning of the handle bar 19 will wind up or pay out the chain to raise or lower arms 16 and thus regulate the height of the blade carrying section 14 of the frame. In the illustrated example the chain winds up on a ratchet wheel 18, turning with handle bar 19 and its rod 19$^a$ and the handle bar is secured in fixed position by any suitable means such as a pawl 20 adapted to engage a ratchet 20$^a$ on the shaft 19$^a$.

The frame section 14 is freely suspended at the connections 15 and carries at the rear side a grass roller 24 over which extends a grass board 25 rearwardly from the fixed cutter bar or cutter positioned at 26 in the said frame section, relatively to which the revolving cutter 27 turns, said cutter having blades of the usual form. The frame section 14 with the cutter 27, and roller 24, can freely follow the contour of the ground by reason of the pivotal suspension of said frame section. The connection of the frame section 14 with the arms 16 of the main frame permits of said frame section and the cutter being readily detached when desired.

The cutter is driven as follows: The running wheel 12 constitutes the drive wheel and has an annular series of sprocket teeth depressed in a groove in the face of the wheel as indicated at 28 and a chain 29 extends about said teeth and about a sprocket wheel 30 which is set in the carrying frame 10 so that the pulling strain by which it is made to turn, is exerted on said carrying frame and not on the cutter frame 14. Said wheel 30 turns in a slot 31 in the frame 10, its shaft 32 being journaled in said frame and the outer end of said shaft is connected by a gimbal joint 33 with a tumbler shaft formed of telescoping non-circular sections 34, 35, one sliding in the other or being capable of being fully withdrawn therefrom as occasion may require. The opposite end of said tumbler shaft connects by a gimbal joint 36 with a shaft 37 in the frame 14 and carrying a sprocket wheel 38 over which a chain 39 runs to a sprocket wheel 40 on the shaft 41 of the cutter 27 for turning the latter. The sprocket wheels 30, 38 will ordinarily be in approximate alinement and the described drive connection permits the automatic adjustment of the shaft to the shifting position of the frame section 14 in the roller 24 following the ground contour and also permits of the ready disconnection when desired.

The pull exerted by the drive chain 29 on the sprocket wheel 30 is transmitted to the main frame and, therefore, no pull is exerted on the cutter frame 14. Also, it will be observed that the drive connection is established between the pinion 30 and the cutter irrespective of the tilting of the main frame in the raising or lowering of the cutter frame. The tumbler shaft in the drive shown allows for the swinging of the cutter frame without disturbing the drive connections. The use of the unitary drive wheel centrally disposed obviates the employment of running wheels at the ends of the cutter and the arrangement permits of the cutter being run close to walks, fences, and the like, and also makes it possible to trim the edges of lawns and to mow narrow strips and do similar work now usually done with trimmers.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A lawn mower including a wheeled main frame, a cutter-carrying frame suspended on the main frame to have movement relatively thereto for following the contour of the ground, said main frame being tiltable and said cutter frame being adapted to be raised or lowered by the tilting of the main frame.

2. A lawn mower including a main frame mounted to be tilted, a cutter frame freely suspended on said main frame at the front to swing thereon in following the contour of the ground, and subject to the tilting of the main frame for raising and lowering the cutter frame.

3. A lawn mower including a main frame mounted to be tilted, a cutter frame freely suspended on said main frame at the front to swing thereon in following the contour of the ground, and subject to the tilting of the main frame for raising and lowering the cutter frame; together with means for tilting said main frame.

4. A lawn mower including a wheeled main frame adapted to be tilted, a cutter frame swingably suspended on the main frame at the front, a roller on said cutter frame rearward of a line passing vertically through the point of suspension thereof and adapted to run on the ground and means to tilt said main frame to raise or lower the cutter frame.

5. A lawn mower including a wheeled main frame, a cutter frame truly suspended on the main frame to swing thereon in the operation of the mower, to adapt it to follow the contour of the ground, a cutter carried by said cutter frame and drive mechanism for said cutter, said mechanism comprising drive means on the main frame, means to actuate said drive means, a driven element on said cutter to actuate the latter, and means effecting a drive connection between said drive means and said driven element irrespective of the relative swinging of the cutter frame.

6. A lawn mower including a main frame, a cutter frame swingably suspended on the main frame, a cutter carried by the cutter frame, and drive mechanism for said cutter, said mechanism comprising a driven chain, a sprocket wheel driven by said chain and mounted in said main frame so that the pull exerted on said sprocket wheel by the chain is transmitted to said main frame, a driven element on the cutter, and means affording a drive connection between said sprocket wheel and said driven element irrespective of the swinging of the cutter frame.

7. A lawn mower including a main frame, a cutter frame swingably suspended on the main frame, a cutter carried by the cutter frame, and drive mechanism for said cutter, said mechanism comprising a driven chain, a sprocket wheel driven by said chain and mounted in said main frame so that the pull exerted on said sprocket wheel by the chain is transmitted to said main frame, a wheel on the cutter frame, drive connections between said sprocket wheel and said wheel on the cutter frame, said connections including a tumbler shaft composed of telescoping sections, a driven wheel on said cutter, and a drive connection between said wheel on the cutter frame and said driven wheel on the cutter.

8. A lawn mower including a running wheel, a main frame mounted to rock about the axis of the running wheel, a cutter frame suspended on the main frame at the front end to have swinging movement independently on said frame and relatively thereto and constrained to partake of the movements of the main frame in being raised or lowered, cutter mechanism on the second-mentioned frame, drive means on the main frame, and driven means on the cutter mechanism in driving engagement with said drive means, irrespective of the swinging of the main frame or the relative rocking of the cutter frame.

9. A lawn mower including a frame mounted to be tilted, cutter means adapted to be raised or lowered by the tilting of said frame, a propelling handle, a cross bar on said handle and mounted to turn about its own axis, and means to tilt the frame by the turning of said cross bar.

10. A lawn mower including a propelling handle, a cross bar thereon turnable about its own axis, a tiltable frame, cutter mechanisms adapted to be raised or lowered by the tilting of said frame, a flexible element adapted to be wound or unwound by the turning of said cross bar and having connection with said frame.

11. A lawn mower including a tiltable frame, cutter mechanism adapted to be raised or lowered by the tilting of said frame, a running wheel supporting said frame and positioned approximately at the longitudinal center of the mower in the rear of the cutting mechanism, said frame having an arched member extending over said wheel, a propelling handle, a cross bar on said handle and turnable about its own axis, a flexible element adapted to be wound or unwound by the turning of said cross bar and extending forwardly therefrom along the under side of said handle, and an idler about which said flexible element extends and from which it passes to a connection with said arched member.

GALEN WOOD.